United States Patent
Kim et al.

(10) Patent No.: US 11,205,783 B2
(45) Date of Patent: Dec. 21, 2021

(54) FUEL CELL BIPOLAR PLATE INCLUDING CORROSION-RESISTANT FERRIC OXIDE LAYER

(71) Applicant: Robert Bosch GmbH, Stuttgart (DE)

(72) Inventors: Soo Kim, Cambridge, MA (US); Mordechai Kornbluth, Brighton, MA (US); Jonathan Mailoa, Cambridge, MA (US); Georgy Samsonidze, San Francisco, CA (US); Lei Cheng, Sunnyvale, CA (US); Sondra Hellstrom, East Palo Alto, CA (US); Boris Kozinsky, Waban, MA (US); Nathan Craig, Santa Clara, CA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/527,847

(22) Filed: Jul. 31, 2019

(65) Prior Publication Data

US 2021/0036335 A1    Feb. 4, 2021

(51) Int. Cl.
*H01M 8/0228* (2016.01)
*H01M 8/0215* (2016.01)
*B08B 3/08* (2006.01)
*H01M 8/021* (2016.01)
*H01M 8/1018* (2016.01)

(52) U.S. Cl.
CPC ............ *H01M 8/0228* (2013.01); *B08B 3/08* (2013.01); *H01M 8/021* (2013.01); *H01M 8/0215* (2013.01); *H01M 2008/1095* (2013.01)

(58) Field of Classification Search
CPC .. H01M 8/0228; H01M 8/021; H01M 8/0215; B08B 3/08

USPC ................ 429/518, 519, 520, 522
See application file for complete search history.

(56) References Cited

U.S. PATENT DOCUMENTS

| | | | |
|---|---|---|---|
| 5,786,296 | A | 7/1998 | Shustorovich et al. |
| 5,797,357 | A | 8/1998 | Kawachi et al. |
| 6,084,146 | A | 7/2000 | Barkatt et al. |

(Continued)

FOREIGN PATENT DOCUMENTS

JP        09125224 A    *    5/1997

OTHER PUBLICATIONS

Kim et al., A new method for the identification and quantification of magnetite—maghemite mixture using conventional X-ray diffraction technique, 2012, Talanta, 94, 348-352 (Year: 2012).*

(Continued)

*Primary Examiner* — Sean P Cullen
(74) *Attorney, Agent, or Firm* — Brooks Kushman P.C.

(57) ABSTRACT

Corrosion-resistant oxide films for use with proton exchange membrane fuel cells are described. Bipolar plates of proton exchange membrane fuel cells are subject to highly-acidic environments that can degrade the bulk material and associated properties of the bipolar plate leading to reduced proton exchange membrane fuel cell lifetimes. Materials, structures, and techniques for increasing the corrosion resistance of bipolar plates are disclosed. Such materials include substrates having a surface portion, which includes an $Fe_2O_3$ oxide layer having (110), (012), or (100) $Fe_2O_3$ surface facets configured to impart corrosion-resistance properties to the substrate.

19 Claims, 8 Drawing Sheets

(56) References Cited

U.S. PATENT DOCUMENTS

| | | | | |
|---|---|---|---|---|
| 2004/0247978 | A1* | 12/2004 | Shimamune | C25B 9/10 429/518 |
| 2006/0182989 | A1* | 8/2006 | Blejde | C23C 8/10 428/632 |
| 2010/0015473 | A1* | 1/2010 | Hendriksen | H01M 8/0232 429/486 |
| 2014/0030635 | A1* | 1/2014 | Nakada | H01M 8/0208 429/516 |
| 2017/0279128 | A1* | 9/2017 | Iversen | C22C 38/52 |
| 2018/0013153 | A1* | 1/2018 | Kamepalli | H01M 8/1004 |

OTHER PUBLICATIONS

Zainuri, Mochamad, Hematite from Natural Iron Stones as Microwave Absorbing Material on X-Band Frequency Ranges, 2017, IOP Conference Series: Materials Science and Engineering, 196, 1-4 (Year: 2017).*

Wang, Wei, Jane Y. Howe, and Baohua Gu. "Structure and morphology evolution of hematite ($\alpha$-Fe2O3) nanoparticles in forced hydrolysis of ferric chloride." The Journal of Physical Chemistry C 112.25 (2008); 9203-9208.

Wang, Heli, Mary Ann Sweikart, and John A. Turner. "Stainless steel as bipolar plate material for polymer electrolyte membrane fuel cells." Journal of Power Sources 115.2 (2003): 243-251.

J. An et al. "First-Principles Study of Sulfur Atom Droping and Adsorption on $\alpha$-Fe2O3 (0001) Film." Physics Letter A 380(2016): 3149-3154.

Rajaei, Vahid, et al. "The study of Ni-based nano-crystalline and amorphous alloy coatings on AISI 304 stainless steel for PEM fuel cell bipolar plate application." International Journal of Hydrogen Energy 42.20 (2017): 14264-14278.

Huang, Xu, Sai Kumar Ramadugu, and Sara E. Mason. "Surface-specific DFT+ U approach applied to $\alpha$-Fe2O3 (0001)." The Journal of Physical Chemistry C 120.9 (2016): 4919-4930.

Lin, Kaijie, et al. "Surface modification of 316 stainless steel with platinum for the application of bipolar plates in high performance proton exchange membrane fuel cells." International journal of hydrogen energy 42.4 (2017): 2338-2348.

Trainor, Thomas P., et al. "Structure and reactivity of the hydrated hematite (0 0 0 1) surface." Surface Science 573.2 (2004): 204-224.

* cited by examiner

FIG. 8A

FUEL CELL BIPOLAR PLATE INCLUDING CORROSION-RESISTANT FERRIC OXIDE LAYER

TECHNICAL FIELD

The present disclosure is generally directed to corrosion-resistant oxide films for use with proton exchange membrane fuel cells, More specifically, the present disclosure relates to bipolar plates of proton exchange membrane fuel cells having corrosion-resistant, iron oxide substrate surface structures and methods of producing the same.

BACKGROUND

Fuel cells and, specifically, proton exchange membrane fuel cells (PEMFCs) hold great promise as high efficiency, high power density, relative light weight, and zero carbon emission. energy sources for use in a wide variety of applications. Such applications include, but are not limited to, transportation, stationary power generation, and portable power generation. Particularly relevant to its automotive and other transportation-related applications, the PEMFC represents an environmental-friendly alternative to internal combustion engines for a variety of vehicles.

PEMFCs operate based on the transfer of protons between an anode and a cathode. Key components of PEMFCs include, among others, a proton exchange membrane through. which protons are transferred and a membrane-electrode assembly (MEA) in which the proton exchange membrane is included. PEMFCs also include bipolar plates (BPPs), which connect and separate individual fuel cells in series to form a fuel cell stack. Among other functions, BPPs provide required voltage, assist in the distribution of fuel gas and oxygen over the MEA's active surface, and conduct electrical current from the anode of one cell to the cathode of the next within the stack. In view of such functionality, BPPs are required to be not only sufficiently chemically-inert to resist degradation. in the highly corrosive environment of the fuel cell, but also sufficiently electrically-conducting to facilitate electron transfer for the oxygen reduction reaction of the filet cell.

BPPs may constitute 60 to 80% of the PEMFC stack weight and are among the most expensive PEMFC components, often contributing between 25% and 45% of the stack cost. Although other metals such as titanium and aluminum. may be used, BPPs are typically made from stainless steel. As PEMFC operation typically takes place in highly-acidic environments, BPP materials with high corrosion resistance is desired for long-term PEMFC operation. Treating techniques such as introducing conductive oxide and/or nitride coatings to stainless steel BPPs may help to improve their lifetime in the acidic PEMFC environment. Despite the potential of such techniques, the corrosive formation of $Fe_2O_3$ is inevitable when Fe metal is exposed to water and oxygen as it is in the acidic operating conditions of the PEMFC environment. Accordingly, materials, structures, and techniques for increasing the corrosion resistance of BPP materials are desired.

SUMMARY

In at least one embodiment, a corrosion-resistant substrate is disclosed. The substrate may include a bulk portion and a surface portion including an $Fe_2O_3$ oxide layer having (110), (012), or (100) $Fe_2O_3$ surface facets configured to impart corrosion-resistance properties to the substrate, In some embodiments the $Fe_2O_3$ oxide layer is between 0.001 and 0.5 μm thick. Additionally, the $Fe_2O_3$ oxide layer of the corrosion-resistant substrate may be characterized by a surface morphology having a first surface-facet group including (110), (012), or (100) $Fe_2O_3$ surface facets and a second surface-facet group including (001) or (101) $Fe_2O_3$ surface facets such that the $Fe_2O_3$ oxide layer is predominantly comprised of the first surface-facet group. In accordance with one or more embodiments, the surface portion of the corrosion-resistant substrate may include a protective coating comprising MgO, $Al_2O_3$, $TiO_2$, or $ZrO_2$. In another embodiment, the surface portion of the corrosion-resistant substrate may include a protective coating formed of ternary (or higher) chemical compounds such as, for example, $ABO_x$, where A is Mg, Al, Ti, or Zr, B is Zn, Sn, Cr, or Mo, and x is an integer ranging from 1 to 8.

In another embodiment, a bipolar plate (BPP) for a proton exchange membrane fuel cell (PEMFC) is disclosed. The BPP may include a corrosion-resistant substrate comprising a bulk portion. and a surface portion including an $Fe_2O_3$ oxide layer having (110), (012), or (100) $Fe_2O_3$ surface facets configured to impart corrosion-resistance properties to the substrate. In some embodiments the $Fe_2O_3$ oxide layer is between 0.001 and 0.5 μm thick. The $Fe_2O_3$ oxide layer of the corrosion-resistant substrate may be characterized by a surface morphology having a first surface-facet group including (110), (012), or (100) $Fe_2O_3$ a surface facets and a second surface-facet group including (001) or (101) $Fe_2O_3$ surface facets such that the $Fe_2O_3$ oxide layer is predominantly comprised of the first surface-facet group. The BPP substrate may be composed of stainless steel. In accordance with one or more embodiments, the surface portion of the BPP substrate may include a protective coating comprising MgO, $Al_2O_3$, $TiO_2$, or $ZrO_2$. In another embodiment, the surface portion of the BPP substrate may include a protective coating formed of ternary (or higher) chemical compounds such as, for example, $ABO_x$, where A is Mg, Al, Ti, or Zr, B is Zn, Sn, Cr, or Mo, and x is an integer ranging from 1 to 8, In one or more embodiments, the corrosion resistance of the surface portion of the BPP substrate is less than 1 μA $cm^{-2}$ at 80° C., pH between 2 and 3 and in the presence of about 0.1 ppm HF.

In still other embodiments, methods of producing corrosion-resistant substrates are disclosed. According to at least one embodiment, the method may include cleaning a stainless steel substrate with organic solvent and electrochemically oxidizing the stainless steel substrate to form a corrosion-resistant surface portion including an $Fe_2O_3$ oxide layer having (110), (012), or (100) $Fe_2O_3$ surface facets. In another embodiment, the method may include growing the $Fe_2O_3$ oxide film on a stainless steel substrate through the use of a solution-based process. In one example, hydrolysis can be conducted at 80 to 100° C. in a water bath with a various aging time of 1, 2, 3, 4, 5, 10, 15, 20, 25, 30, 35, 40, 45, 50, 55, or 60 minutes. In other examples, hydrolysis is conducted at 25 to 100° C. in a water bath with an aging time of between 1 and 120 minutes.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The description of a group or class of materials as suitable for a given purpose in connection with one or more embodiments implies that mixtures of any two or more of the members of the group or class are suitable. Description of constituents in chemical. terms refers to the constituents at the time of addition to any combination specified in the description and does not necessarily preclude chemical interactions among constituents of the mixture once mixed.

Except where expressly indicated, all numerical quantities in this description indicating dimensions or material properties are to be understood as modified by the word "about" in describing the broadest scope of the present disclosure.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Reference is being made in detail to compositions, embodiments, and methods of embodiments known to the inventors. However, it should be understood that disclosed embodiments are merely exemplary of the present invention which may be embodied in various and alternative forms. Therefore, specific details disclosed herein are not to be interpreted as limiting, rather merely as representative bases for teaching one skilled in the art to variously employ the present invention.

The term "substantially" or "about" may be used herein to describe disclosed or claimed embodiments. The term "substantially" or "about" may modify a value or relative characteristic disclosed or claimed in the present disclosure. In such instances, "substantially" or "about" may signify that the value or relative characteristic it modifies is within ±0%, 0.1%, 0.5%, 1%, 2%, 3%, 4%, 5%, or 10% of the value or relative characteristic.

Corrosion is a natural process which converts a refined metal to a more chemically-stable form such as the metal's oxide(s), hydroxide(s), sulfide(s), and/or other salts. The conversion. presents a gradual. destruction of the metal. material caused by electrochemical oxidation of the metal in reaction with an oxidant such as oxygen or sulfates. Corrosion may be invoked by exposure of the metal substrate to moisture in the air, to a solution with a relatively low pH, various chemical substances such as acids, microbes, elevated temperatures, and/or other factors, Especially in acidic environments, corrosion starts at the interface between a bulk metal material (e,g., steel) and a solution (e.g., ions dissolved in water or water surface layer which react to degrade the bulk material).

Due to the highly-acidic operating environment, corrosion-resistant metals, metal surfaces, treatments, and coatings are of particular utility in proton exchange membrane fuel cells (PEMFC). PEMFCs typically operate in acidic conditions where the pH is commonly between 2 and 4. Operating temperatures of within a PEMFC stack range from approximately 60 to 85° C. These and other factors contribute to the strongly-corrosive operating environment of PEMFCs, Between startups and shutdowns, for example, low voltages exist within the PEMFC stack and, during PEMFC operation, fluorine ions are released from the degradation of the polymer membrane. Additionally, both $H_2$ and $O_2$ exist at the anode during startup and shutdown, which causes high cathodic potential yielding cathodic corrosion. In view of such conditions, PEMFCs require durable components capable of withstanding the corrosive operating environment.

Early fuel cell systems often employed graphite for the PEMFC's bipolar plate (BPP) because graphite can achieve high chemical stability and conductivity within the PEMFC environment. Graphite, however, is both brittle and high cost. Stainless steel is now commonly thought as one of the best candidates for BPPs due to its excellent mechanical stability, electrical and thermal conductivities, and the relative ease with which it is fabricated. Stainless steel is, of course, the general name for a number of different steel compositions. Stainless steels typically include at least 10% chromium (Cr) that can form a stable chrome-oxide surface layer known to prevent "staining" of the metal surface. SS304 and SS316 are two of the most common stainless steel compositions. SS304 contains 18% Cr and 8% nickel (Ni). SS316 contains 16% Cr, 10% Ni, and 2% molybdenum (Mo). Depending upon the nature of its particular application, stainless steel compositions can be varied. Such variation leads to distinct mechanical stabilities, corrosion resistances, and magnetic properties. As is known, aside from iron (Fe), Cr, Ni, and Mo, other elements in stainless steel include: carbon (~0.03%), manganese (1~2%), silicon (0.5-2%), nitrogen (0.01-0.1%), copper (0.5-2%), and cobalt (<0.5%).

Although less so than pure Fe, stainless steel is still susceptible to corrosion. Stainless steel corrosion takes place when the metal is exposed to and reacts with water/air and various contaminants on the metes surfaces. When Fe is exposed to water and oxygen, it leads to the formation of rust, which is typically characterized by the formation of red-colored oxide, Rust comprises the oxidized forms of Fe—i.e., hydrated iron (III) oxides (specifically, $Fe_2O_3 \cdot xH_2O$) and iron (III) oxide-hydroxides (specifically, $FeO(OH)$ and $Fe(OH)_3$). In acidic environments, the formation of such iron oxide complexes may accelerate and some of these oxides can further dissolve into the solution.

When the iron-based oxide films are formed on stainless steel BPPs, the contact resistance and electrical conductivity of the PEMFC will be significantly affected. Most oxides are insulators, for example, and thus negatively impact the electrical conductivity of the bulk material. This is especially problematic in the case of BPPs designed to be highly electron-conducting in nature. Formation of insulating oxide film layers on BPPs reduce the transfer of electrons, which can lead to decreased PEMFC output performance. Additionally, corrosion films may grow over time leading to greater contact resistance. Significantly, if the products of such corrosion can be ionized (e.g., $Fe^{2+}$ or $Fe^{3+}$), acidic solution containing such ions can be transported to other fuel cell components. Within PEMFC stacks, Fe dissolution can, for example, poison the Pt catalyst leading to decreased reaction rates of $H_2$ and $O_2$ adsorptions, $H_2O$ formation, and poor fuel cell efficiencies.

Among many efforts to prevent or slow corrosion of metals, various types of coatings have been developed. Examples include applied coatings such as paint, plating, enamel, reactive coatings including corrosion inhibitors such as chromates, phosphates, conducting polymers, surfactant-like chemicals designed to suppress electrochemical reactions between. the environment and the metal substrate, anodized surfaces, and biofilm coatings. in the case of BPPs used in PEMFC stacks, corrosion resistance can be imparted through the use of treating techniques such as introducing conductive oxide and/or nitride coatings to the stainless steel. Despite such. techniques, the corrosive formation of $Fe_2O_3$ is inevitable when Fe metal is exposed to water and oxygen as it is in the acidic operating conditions of the PEMFC environment.

Figure 1:
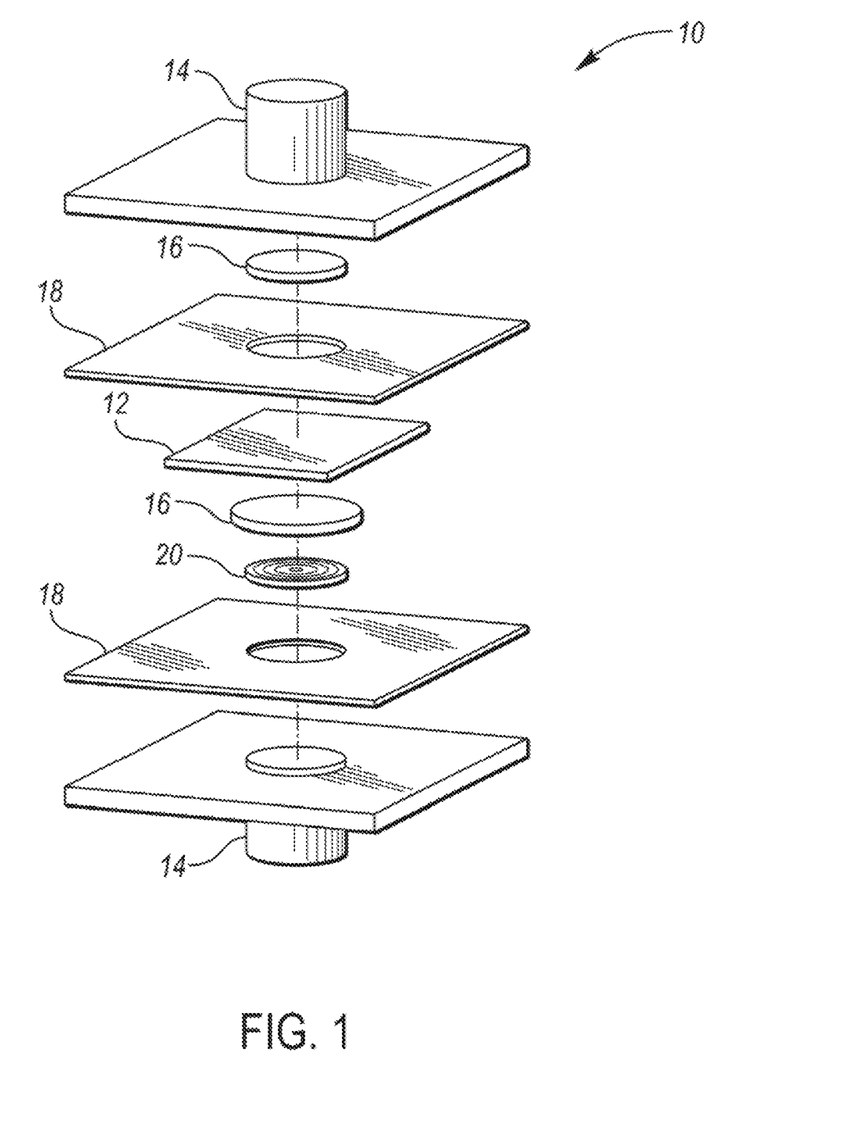
FIG. 1 shows a schematic depiction of a proton exchange membrane fuel cell including a bipolar plate according to one or more embodiments.

As described in the present disclosure, some surface-formed $Fe_2O_3$ in stainless steel and in other primarily-Fe metal compositions—are more resistant to metal dissolution. First-principles density functional theory (DFT) calculations can be used to determine the relevant energetics of $Fe_2O_3$ oxide surfaces. In accordance with the present disclosure, the formation of corrosion-resistant $Fe_2O_3$ surfaces can be carefully controlled, and imparted upon stainless steel BPPs, by tuning the narrow range of $Fe_2O_3$ surface energies, which are sensitive to synthesis conditions and local environment, A non-limiting example of a proton exchange membrane fuel cell is depicted in FIG. 1. A core component of PEMFC 10 is membrane-electrode assembly (MEA) 12, which assists the electrochemical reaction within the stack. MEA 12 includes subcomponents such as electrodes, catalysts, and proton-exchange membranes, In addition to MEA 12, PEMFC 10 typically includes other components such as current collectors 14, gas diffusion layer(s) 16, gaskets 18, and at least one bipolar plate (BPP) 20.

BPP 20 is implemented in a PEMFC stack to distribute gas, collect current, and separate individual cells in the stack from each other, BPP 20 also provides additional functions such as removal of reaction products and water as well as thermal management within PEMFC 10. BPP 20 thus forms a crucial part of PEMFC 10. BPP 20 is also both a relatively expensive component and a frequent reason for degradation of the PEMFC system., For example, BPPs may constitute about 60 to 80% of the stack weight of PEMFC 10, about 50% of the stack volume, and about 25-45% of the stack cost. BPP 20 presents a yet another material challenge as BPP 20 is also required to be sufficiently electrically-conducting in order to facilitate electron transfer for the oxygen reduction reaction. Accordingly, BPP 20 material should be both electrically conducting and chemically inert to reactions with ions present in PEMFC 10 environment.

The metal surface of BPP 20, which may comprise stainless steel, may include a coating such as a graphite-like coating or a protective oxide and/or nitride coating to increase corrosion resistance of BPP 20. BPP 20 surface may thus include elements such as Fe, Cr, Ni, Mo, Mn, Si, P, C, S, or a combination thereof. Alternative coatings include Ti alloy, doped $TiO_x$, TiN, CrN, or ZrN. Again, even where such coatings are employed, in an aggressively corrosive environment such as that of PEMFC 10, materials, structures, and techniques for increasing the corrosion resistance of BPP materials (e.g., stainless steel) are desired. in. accordance with embodiments set forth herein, materials, structures, and techniques for increasing the corrosion resistance of stainless steel BPPs are disclosed.

Figure 2:
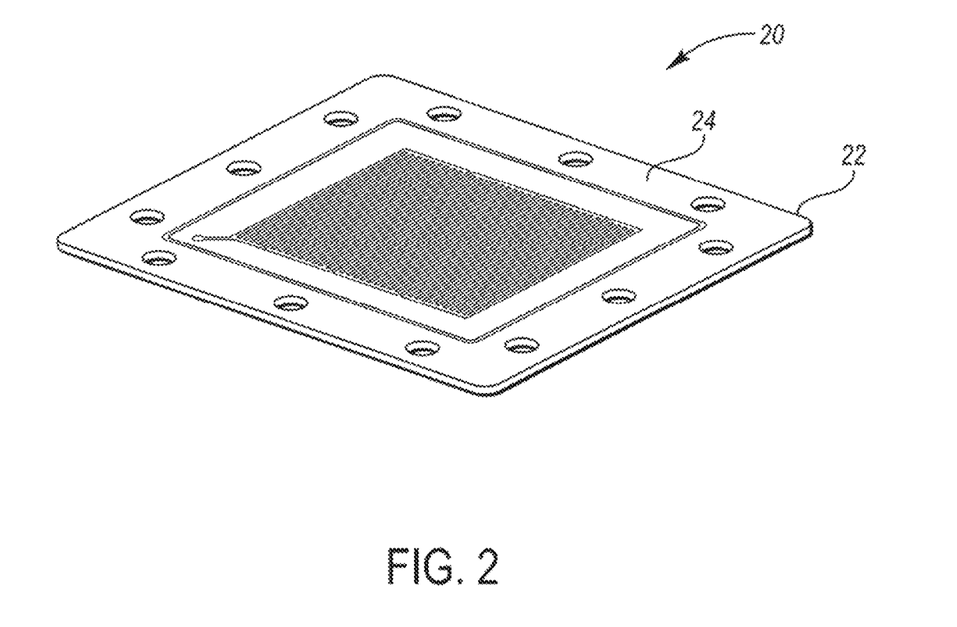
FIG. 2 shows a perspective view of a non-limiting example of a bipolar plate having a surface portion including corrosion-resistant, iron oxide structure according to one or more embodiments.

A non-limiting example of PEMFC bipolar plate (BPP) 20 is depicted in FIG. 2. BPP 20 represents a non-limiting example of a substrate having solid body or bulk portion 22 and surface portion 24. Bulk portion 22 may be formed from a metal such as stainless steel. Alternatively, bulk portion 22 may be formed from graphite, steel, aluminum, copper, an alloy of two or more metals, a. combination thereof, or a composite material. Surface portion 24 may include a corrosion-resistant, iron oxide film. structure in accordance with. one or more embodiments. The entire area of surface portion 24 may include the iron oxide film structure. Alternatively, surface portion 24 may include one or more sub portions which are free from. the iron oxide film structure. in one embodiment, the entire surface portion 24 includes the iron oxide film structure. Surface portion 24 may further include protective coatings such as binary oxide coatings applied in nanoscale to micron-sized (few nm to 100 µm) applied on top of the corrosion-resistant, iron oxide film structure. Such. binary oxide coating materials include, but are not limited to, MgO, $Al_2O_3$, $TiO_2$, and $ZrO_2$. These oxide coating materials can be un-doped, and/or doped partially with nitrogen, carbon, or fluorine to further enhance the resultant electric conductivity. Further still, surface portion 24 may include protective coatings formed of ternary (or higher) chemical compounds such as, for example, $ABO_x$, where A is Mg, Al, Ti, or Zr, B is In, Sn, Cr, or Mo, and x is an integer ranging from 1 to 8. In accordance with some embodiments, the protective coating may include conductive nitrides and/or carbides.

The thickness of surface portion 24 and its associated corrosion-resistant, iron oxide film layer may be adjusted according to the specific application and may range from a few nm to about 1 µm. The iron oxide film layer itself may also range in thickness from around 1 nm to about 1 µm. Non-limiting examples of the such thicknesses may be about 0.1 to 0.8 µm, 0.2 to 0.6 µm, or 0.3 to 0.5 µm. In one or more embodiments, the thickness of the corrosion-resistant, iron oxide film may be between 1 nm and 0.5 µm. In other embodiments, the thickness of the corrosion-resistant, iron oxide film may be between 150 nm and 0.3 µm.

Figure 3A:
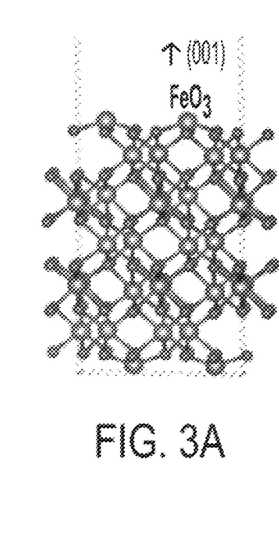
FIGS. 3A to 3E depict morphologically-significant atomic structures of α-$Fe_2O_3$ iron. oxide surfaces.
Figure 3B:
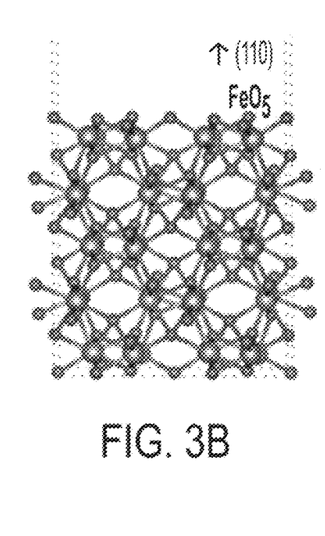
Figure 3C:
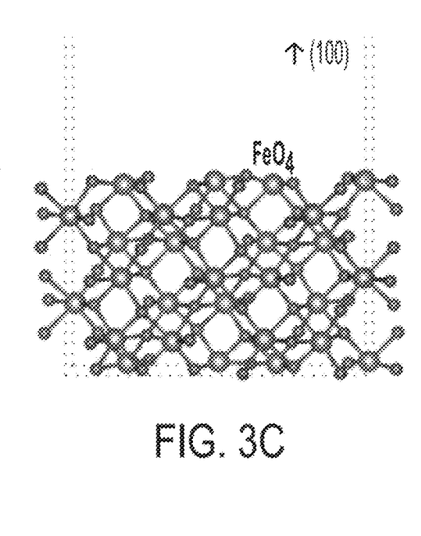
Figure 3D:
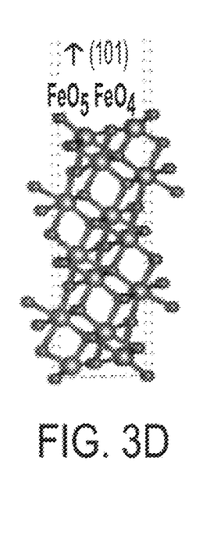
Figure 3E:
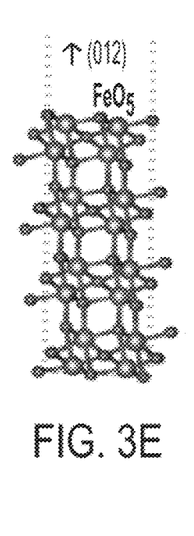

$\alpha\text{-}Fe_2O_3$ iron oxide surfaces may be characterized by their morphological atomic structures. Such surface facet structures can be defined by the following Miller indices: (001), (110), (100), (101), and (012). Each of these morphological $\alpha\text{-}Fe_2O_3$ surfaces is depicted in FIGS. 3A to 3E. FIG. 3A depicts the atomic structure of (001) $Fe_2O_3$. FIG. 3B depicts the atomic structure of (110) $Fe_2O_3$. FIG. 3C depicts the atomic structure of (100) $Fe_2O_3$. FIG. 3D depicts the atomic structure of (101) $Fe_2O_3$. Finally, FIG. 3E depicts the atomic structure of (012) $Fe_2O_3$. The bulk region of $Fe_2O_3$ is composed of $FeO_6$ octahedron, while the surface region is under-coordinated. As shown in FIGS. 3B and 3C, for example, (110) and (012) iron oxide surfaces are both terminated with $FeO_5$ polyhedrons. As shown in FIG. 3D, (101) iron oxide has both $FeO_4$ and $FeO_5$ surface units. (100) and (001) iron oxides are even more under-coordinated at their surface than (101) iron oxide. FIG. 3C shows that (100) iron oxide is terminated with $FeO_4$ and FIG. 3A shows that (001) iron oxide is terminated with. $FeO_3$.

The density functional theory (DFT) surface energy of the iron oxide $Fe_2O_3$ surfaces shown in FIGS. 3A to 3E can be calculated by applying the generalized gradient approximation (GGA) scheme. The Vienna Ab initio Simulation Package (VASP) software can be used to carry out such surface energy calculations. The surface energy, γ, is an amount of energy required to cleave a bulk sample, creating two surfaces exposed to vacuum. Lower surface energy represents a more energetically favorable state and higher surface energy represents a less energetically favorable state. The DFT surface energy of $Fe_2O_3$ (γ) can be calculated based on the following equation (1):

$$\gamma = (E_{0,slab} - n \cdot E_{0,bulk})/(2A) \quad (1),$$

where $E_{0,slab}$ is the total internal DFT energy of the specific $Fe_2O_3$ slab shown in FIGS. 3A to 3E, $E_{0,bulk}$ is the internal DFT energy of the bulk. $Fe_2O_3$ per formula unit, n is the number of formula units in the slab construction, and A is the surface area of a specific facet from the slab construction, The effect of the water-oxide interface is expected to be approximately the same for all iron oxide surfaces shown in FIGS. 3A to 3E. Examples of calculated DFT surface energies of the various $Fe_2O_3$ surfaces depicted in FIGS. 3A to 3E are shown in Table 1 below.

TABLE 1

Calculated DFT Surface Energies of Various $Fe_2O_3$ Surfaces

| | α-$Fe_2O_3$ Surface Facet | | | | |
|---|---|---|---|---|---|
| | (001) | (110) | (100) | (101) | (012) |
| Surface Energy, γ ($J/m^2$) | 0.82 | 0.92 | 1.21 | 1.06 | 0.63 |

As shown in Table 1, (012) $Fe_2O_3$ is the most energetically-favorable surface facet structure followed by (001) and (110) $Fe_2O_3$. (101) and (100) $Fe_2O_3$ exhibit the highest DFT surface energies and are therefore less favorable that the other iron oxide surface structures.

In Fe-based metals such as stainless steel, rust forms in accordance with the following reactions. Specifically, when exposed to water and air, $Fe_2O_3$ forms $Fe_2O_3 \cdot xH_2O$ as outlined below:

(A, oxidation half-reaction)

(B, reduction half-reaction)

(2A+B)

(intermediate state)

(further reaction with $H_2O$ and $O_2$)

Figure 4A:
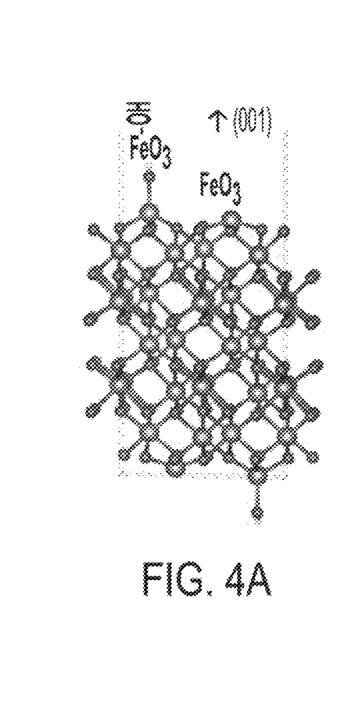
FIGS. 4A to 4E depict atomic structures of iron oxide surfaces including —OH termination.
Figure 4B:
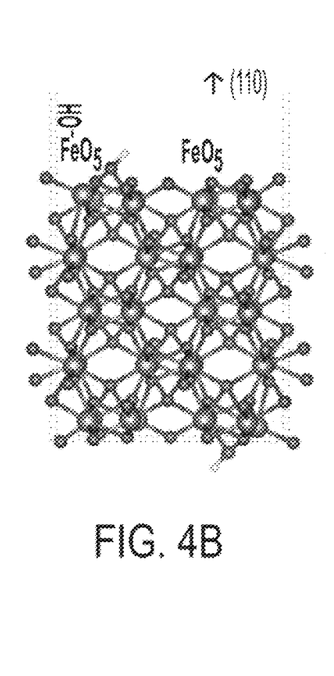
Figure 4C:
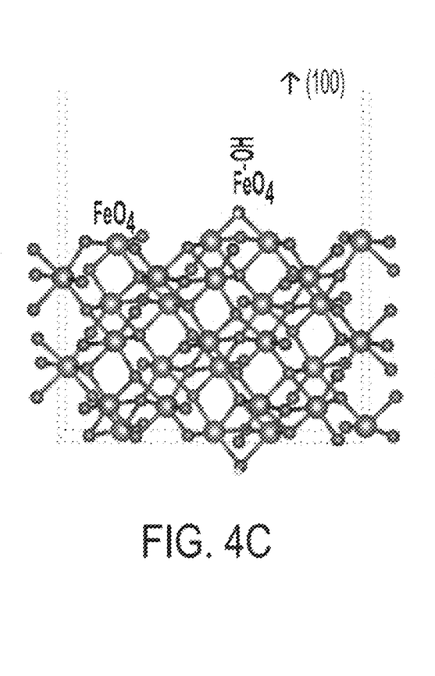
Figures 4D, 4E:
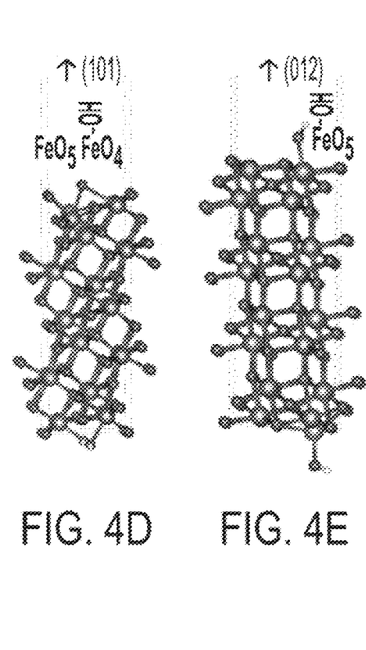

Given the above reaction processes in the formation of rust in Fe-based metals such as stainless steel, the atomic structure of iron oxide $Fe_2O_3$ surfaces can be characterized by —OH termination. Non-limiting examples of the atomic structures of iron oxide surfaces including —OH termination are depicted in FIGS. 4A to 4E. FIG. 4A depicts the atomic structure of (001) $Fe_2O_3$ including —OH termination. FIG. 4B depicts the atomic structure of (110) $Fe_2O_3$ including —OH termination. FIG. 4C depicts the atomic structure of (100) $Fe_2O_3$ including OH termination. FIG. 4D depicts the atomic structure of (101) $Fe_2O_3$ including —OH termination. Finally, FIG. 4E depicts the atomic structure of (012) $Fe_2O_3$ including —OH termination.

Figure 5:
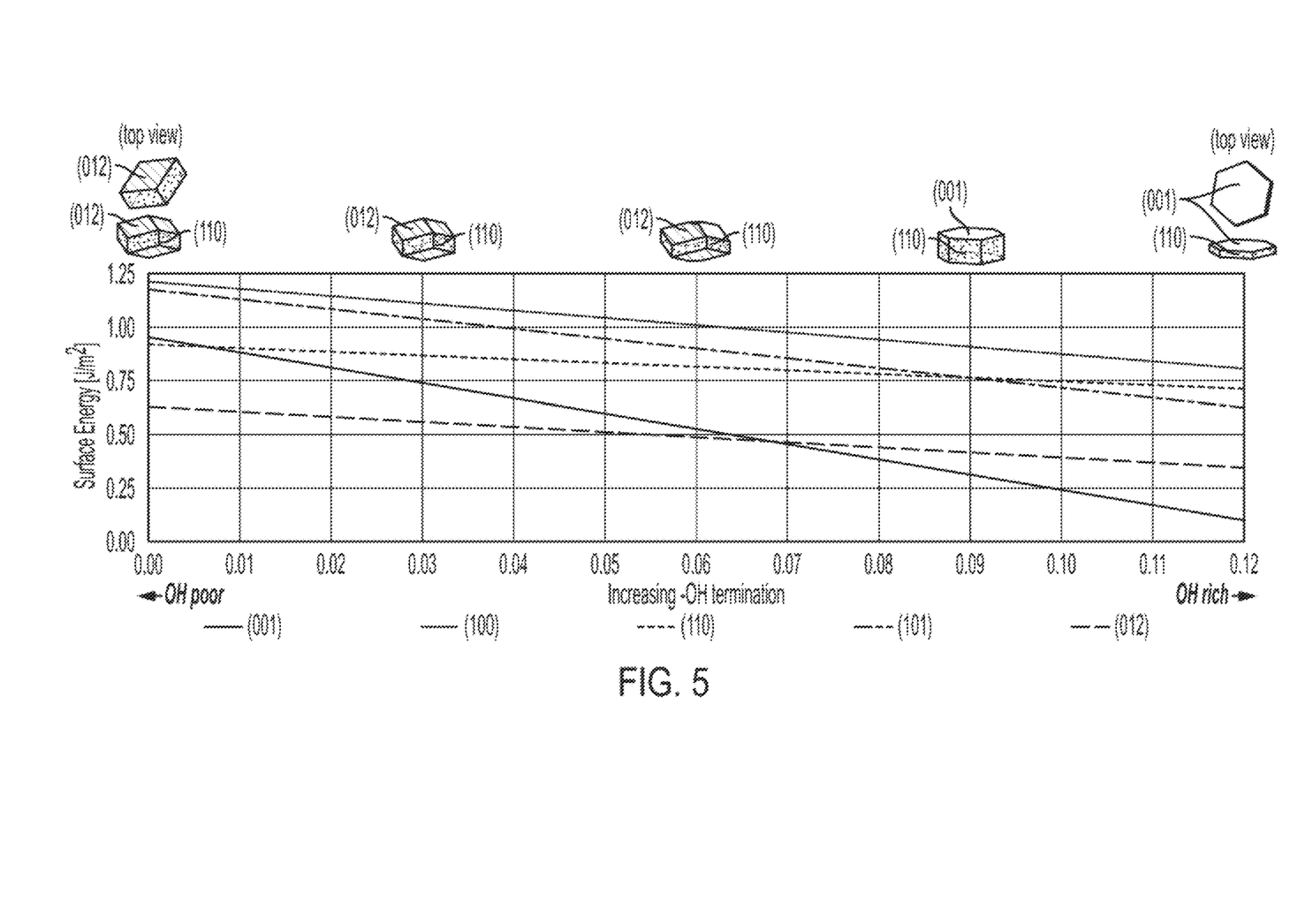
FIG. 5 shows a graph depicting the surface energy of iron oxide surfaces as a function of increasing —OH termination.

A graph depicting the surface energy of iron oxide surfaces as a function. of increasing —OH termination is shown in FIG. 5. The graph shows changes in particle morphologies and affected surface energies as —OH termination is introduced to, and increased within, the $Fe_2O_3$ surface facets set forth in FIGS. 3A to 3E, The calculations supporting the chart of FIG. 5 were carried out as described. above in connection with Table 1. Accordingly, the density functional theory (DFT) surface energies of the iron. oxide $Fe_2O_3$ surfaces have been calculated by applying the generalized gradient approximation (GGA) scheme. The particle shape can be deduced from the calculated surface energies using the known Wulff construction. Consistent with experimental results, FIG. 5 demonstrates that both cubic and hexagonal shapes of $Fe_2O_3$ are observed. FIG. 5 further shows that at dry conditions, $Fe_2O_3$ is cubic (or pseudo-cubic) shape and dominated by (110) and (012) $Fe_2O_3$ surface facets. increased —OH terminations may result from wet conditions—where $H_2O$ is present—and/or acidic conditions—where available protons ($H^+$) have reacted with surface oxygen atoms in $Fe_2O_3$. $Fe_2O_3$ particles of different size and morphology can be achieved by controlling nucleation time. As shown in FIG. 5, the particle shape of —OH terminated $Fe_2O_3$ systems is hexagonal where (001) surface facet dominates. This further explains why the most experimentally-studied $Fe_2O_3$ surface is (001) $Fe_2O_3$.

As demonstrated by FIGS. 3-5 and the disclosure associated therewith, first-principle DFT calculations within generalized gradient approximation (GGA) can accurately reproduce the $Fe_2O_3$ morphology observed in experiment. More advanced computational methods may, however, account for the error of over-delocalization of electrons that are present in the plain GGA approach.

Figure 6A:
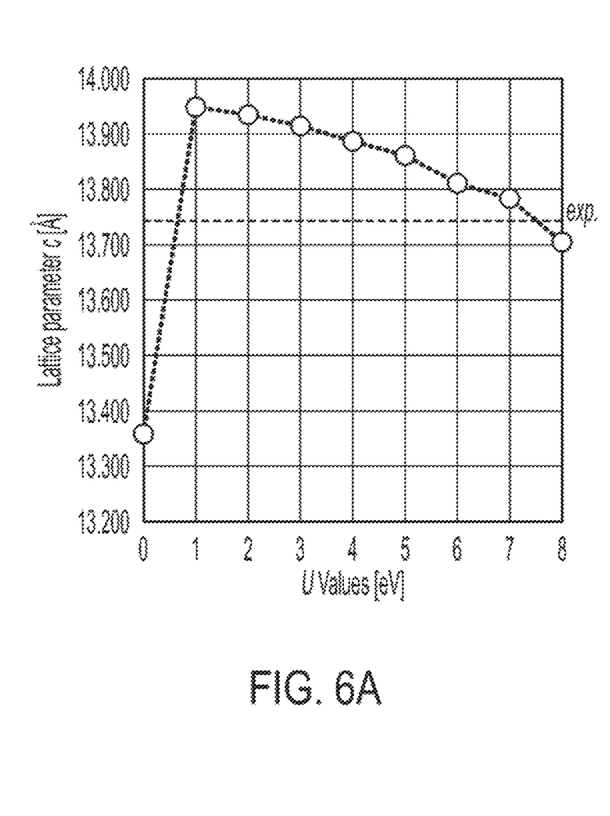
FIGS. 6A and 6B show graphs plotting lattice parameter c and calculated bandgap of $Fe_2O_3$ when different U values are applied to Fe in the density functional theory (DFT) calculations.
Figure 6B:
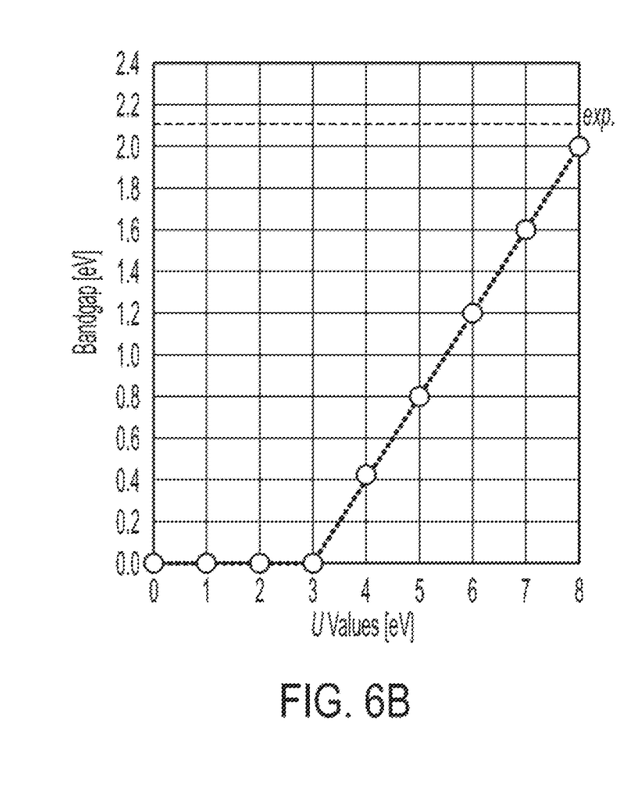
Figure 7A:
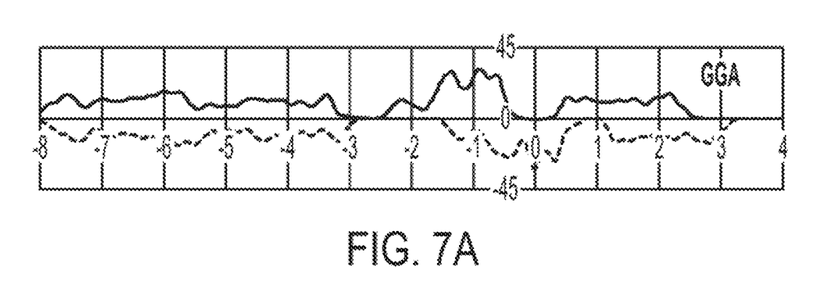
FIGS. 7A to 7D shows graphs of the density of states (DOS) of $Fe_2O_2$, at different U values.
Figure 7B:
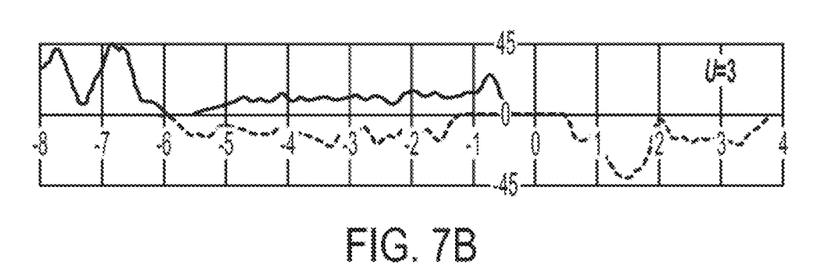
Figure 7C:
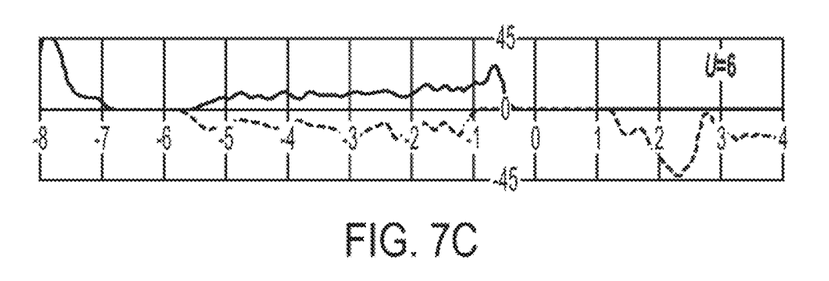
Figure 7D:
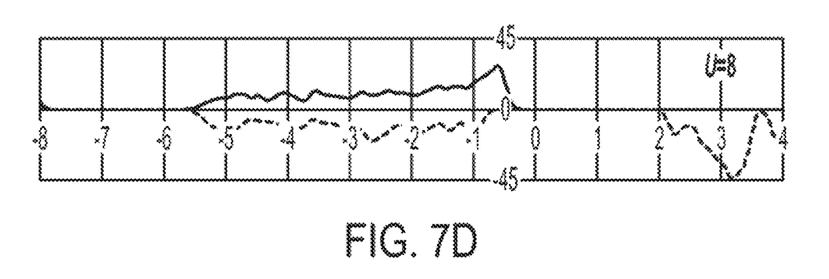

Graphs plotting lattice parameter c and calculated bandgap of $Fe_2O_3$ bulk structure when different U values are applied to Fe in the DFT calculations are shown in FIGS. 6A and 6B. For example, as shown. in the figures, when $U_{Fe}$=8 eV is applied, both lattice parameter c (FIG. 6A, ~13.7 Å) and experimental bandgap (FIG. 6B, 2.0 eV) can be captured. As the $U_{Fe}$ increases in the DFT calculations, both lattice parameter and bandgap approach to the experimental values. Typically, $U_{Fe}$=4 eV is traditionally used for the DFT calculation, which is fitted to the experimental. formation energy of iron oxides. As demonstrated by FIGS. 6A and 6B, however, incorporating $U_{Fe}$=8 eV may more accurately reflect the actual $Fe_2O_3$ system given the close agreement between the experimental and calculated lattice parameter and bandgap when $U_{Fe}$=8 eV.

Graphs of the density of states (DOS) of $Fe_2O_3$ at different U values are shown in FIGS. 7A to 7D. As shown, bandgap opens up as the U values increase. Bandgap ($E_g$) is defined as the distance between the Fermi level, $E_F$(x=0) and the conduction band (where x is positive number in the graphs of FIG. 7), FIGS. 6B and 7A to 7D show, for example, that pure GGA and U=3 have no bandgaps, while higher U values such as $U_{Fe}$=6 and 8 show that distance (near x=0) between the occupied and unoccupied states (i.e., the bandgap) have increased.

Given the parameters discussed above for accurately representing the $Fe_2O_3$ system both structural lye (particle shapes) and electronically (density of states)the energy required to remove Fe atom in each system of (101), (001), (110), (012), and (100) $Fe_2O_3$ can be determined through calculation. Table 2, below, sets forth the lowest Fe surface vacancy formation of the various $Fe_2O_3$ surfaces described above. As shown in Table 2, it would be most difficult to remove Fe from the (110), (012), and (100) $Fe_2O_3$ surfaces and relatively easier to remove Fe from (101) and (001) $Fe_2O_3$ surfaces.

TABLE 2

Calculated DFT Surface Vacancy Formation of Fe of Various $Fe_2O_3$ Surfaces

| α-$Fe_2O_3$ Surface Facet | $\Delta E_{vac, Fe, Surface}$ | Surface Termination |
|---|---|---|
| (101) | 1.457 | $FeO_4$ and $FeO_5$ |
| (001) | 2.728 | $FeO_3$ |
| (110) | 3.057 | $FeO_5$ |
| (012) | 4.331 | $FeO_5$ |
| (100) | 5.987 | $FeO_4$ |

The energy associated with DFT surface vacancy formation of Fe was determined based on the following equation (2):

$$\Delta E_{vac,Fe,Surface} = E_{0,w/FeVacancy} - (E_{0,pristine} + \mu_{Fe}) \quad (2),$$

where $E_{0,w/FeVacancy}$ is the internal DFT energy of the slab $Fe_2O_3$ with one of the surface Fe atoms removed, is the internal DFT energy of the pristine slab, and $\mu_{Fe}$ is the chemical potential of Fe determined from bulk bcc Fe metal. Higher DFT vacancy formation energies indicate increased difficulty associated with removing an Fe atom from the system.

In accordance with the data recorded in Table 2, if $Fe_2O_3$ film can be grown with (110), (012), and (100) surface facets, Fe dissolution may be more difficult compared with the $Fe_2O_3$ film dominated by (101) and (001) surface facets. As already shown in FIG. 5, cubic-shape $Fe_2O_3$ is mostly dominated by (110) and (012) surfaces, while the hexagonal-shape $Fe_2O_3$ includes primarily (001) and (110) surfaces. Preparation and selection of $Fe_2O_3$ surfaces that include increased resistance to Fe dissolution can be used to properly identify and employ corrosion-resistant oxide films for use within the bipolar plates (BPPs) of PEMFC stacks. And although stainless steel corrodes to $Fe_2O_3$, application of high-resistant $Fe_2O_3$ surfaces may prevent (or, at least slow down) further Fe ion dissolutions in the acidic operating environment of PEMFCs. Stainless steel BPPs with protective $Fe_2O_3$ surface layers comprising dissolution-resistant (110), (012), and (100) facets and ranging in thickness from few nm to about 1 µm may minimize and/or suppress dissolution reactions that lead to formation of species such as radicals that can trigger polymer membrane and catalysis degradations in PEMFCs. Pt catalyst poisoning initiated from Fe dissolution, for example, may be suppressed by employing more stable $Fe_2O_3$ surfaces within the BPP—thereby increasing the potential lifetime of PEM FCs.

In one or more embodiments, stainless steel having a corrosion-resistant surface oxide layer comprising (110), (012) and or (100) $Fe_2O_3$ surface facets is used for a PEMFC BPP. In other embodiments, stainless steel having a corrosion-resistant surface oxide layer comprising (001) $Fe_2O_3$ surface facets is used for a PEMFC BPP. Other beneficial surface facets may include a family of lattice planes of ( 110), (012), (100), and/or (001) such as (006), (113), (024), (116), (122), (213), (300), etc, As described above, the thickness of the corrosion-resistant oxide layer may be adjusted according to needs of a specific application and may range from about 1 nm to about 1 µm, Non-limiting examples of the such thicknesses may be about 0.1 to 0.8 µm, 0.2 to 0.6 µm, or 0.3 to 0.5 µm. In certain embodiments, the thickness may be between 1 nm and 0.5 µm. In other embodiments, the thickness of the corrosion-resistant, iron oxide film may be between 150 nm and 0.3 µm.

In accordance with certain embodiments, a stainless steel substrate having a corrosion-resistant surface oxide layer defined by a surface morphology comprising a first surface-facet group including (110), (012), and (100) $Fe_2O_3$ surfaces and a second surface-facet group including (001) and (101) $Fe_2O_3$ surfaces is disclosed. in some embodiments, the first surface-facet group may exclusively include (110), (012), or (100) $Fe_2O_3$ surfaces, In other embodiments, the first surface-facet group may include two or more of the (110), (012), and (100) $Fe_2O_3$ surface structures. Similarly, in some embodiments, the second surface-facet group may exclusively include (001) or (101) $Fe_2O_3$ surfaces. In other embodiments, the second surface-facet group may include both (001) and (101) $Fe_2O_3$ surface structures. In certain embodiments, the $Fe_2O_3$ oxide layer predominantly comprises $Fe_2O_3$ surface structures of the first surface-facet group. in some embodiments, the stainless steel substrate may include a corrosion-resistant surface oxide layer characterized by a surface morphology comprising 70% and 90% of the first surface-facet group and 10% to 30% of the second surface-facet group. Thus, the ratio of the first surface-facet group to second to the second surface-facet group may range from 9:1 to 7:3 in accordance with certain embodiments. In accordance with other embodiments, the stainless steel substrate may include a corrosion-resistant surface oxide layer characterized by a surface morphology comprising greater than 90% of the first surface-facet group. In at least another embodiment, the corrosion-resistant surface oxide layer may be characterized by a surface morphology comprising greater than 95% of the first surface-facet group. Other embodiments may include a corrosion-resistant surface oxide layer characterized by a surface morphology comprising 100% of the first surface-facet group. Some embodiments may include amorphous $FeO_x$ surface structure, where x ranges from 1 to 2. Additional metal impurities may also be included. Such metals include, but are not limited to, Cr, Ni, Co, Mn, and Si.

Figure 8A:
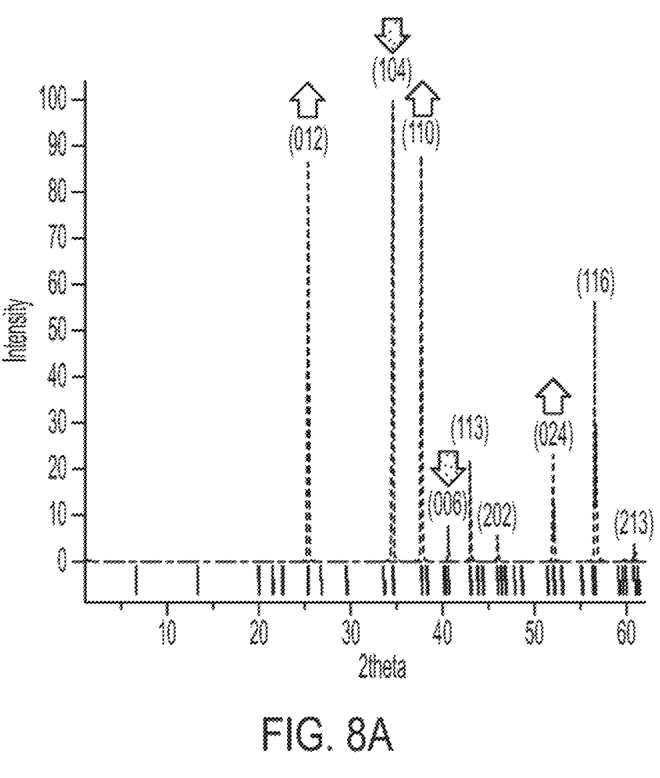
FIGS. 8A and 8B show examples of X-ray powder diffraction (XRD) graphs for two different $Fe_2O_3$ samples.
Figure 8B:
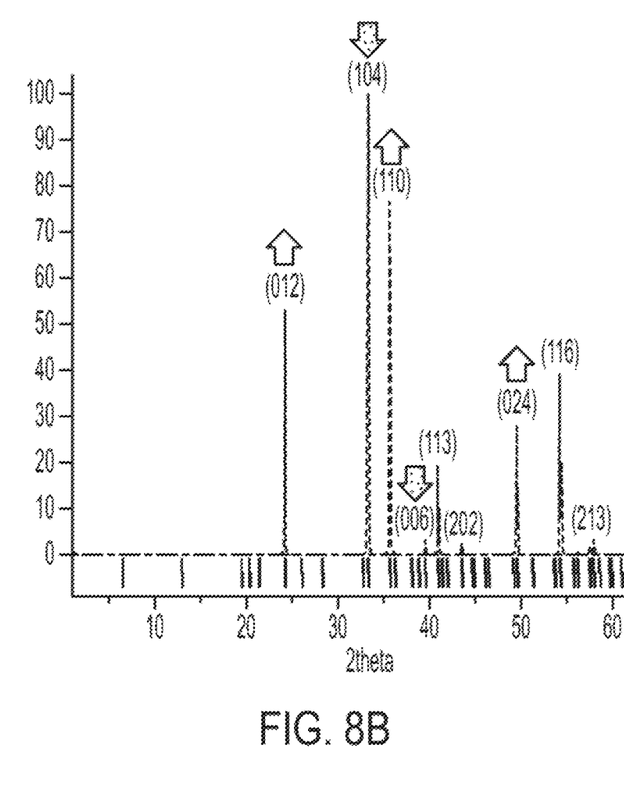

The presence of different $Fe_2O_3$ surface facets may be verified with X-ray powder diffraction (XRD) or high-resolution transmission electron microscope (HR-TEM). For example, (012) peak for $Fe_2O_3$ locates between 24 to 26° 2 θ, (110) locates between 35 to 38° 2 θ, and (300) locates between 62 to 65° 2θ, when measured with XRD with Cu-Kα source (λ=1.54 Å). The relative ratio of different planes may be further quantified using the relative XRD height and/or full-width at half maximum, $Fe_2O_3$ with more (110) and (012) can be identified with HR-TEM with a d spacing of ~0.25 nm, where such structures may appear as a cubic or pseudo-cubic in shape, Of course, once more (001) $Fe_2O_3$ forms, $Fe_2O_3$ may appear as a hexagonal shape, Non-limiting examples of X-ray powder diffraction (XRD) graphs for two different $Fe_2O_3$ samples are shown in FIGS. 8A and 8B. FIGS. 8A and 8B show two examples of $Fe_2O_3$ with different XRD peak intensities. As described above, corrosion-resistant oxide films may include primarily (110), (012), and/or (100) $Fe_2O_3$. surface facets and their family lattice planes (e.g., (024), (300), etc.). FIGS. 8A and 8B show that the relative ratio of different planes in XRD patterns may differ, which can be quantified using either the XRD height and/or fall-width at half maximum. in this case, the 2 theta values in the x-axis are given by using Cu as an X-ray source, specifically the Kα radiation of source of 1.54 Å.

In one or more embodiments, stainless steel BPPs employing the disclosed corrosion-resistant oxide surface layers comprise at least 10 to 20% chromium (Cr) and 5 to 10% nickel (Ni), Other elements in the stainless steel may include, but are not limited to, molybdenum (~1 to 2%), carbon (~0.03%), manganese (1~2%), silicon (0.5-2%), nitrogen (0.01-0.1%), copper (0.5-2%), and cobalt (<0.5%), where the balance is iron (Fe), At the BPP's surface, stable. Cr oxide film (in addition the particular $Fe_2O_3$ oxide films described herein) may additionally be present to slow down the corrosion of the BPP material. In some embodiments, other crystalline and/or amorphous metal oxides including, bat not limited to, NiO, $MoO_2$, $MoO_3$, MnO, $Mn_2O_3$, $MnO_2$, $SiO_2$, CuO, $Co_3O_4$, etc. may also be used to suppress the corrosion of the BPP material.

Due to its composition, structure, and morphology, BPPs composed of the $Fe_2O_3$ surfaces and coatings disclosed in accordance with certain embodiments may include a number of desirable properties. BPPs composed of the $Fe_2O_3$ surfaces and coatings disclosed herein, for example, may exhibit corrosion resistances of less than about 1 $\mu A\, cm^{-2}$ at 80° C., at pH=2 to 3, with the presence of approximately 0.1 ppm of HF in the solution. In other embodiments, the BPP oxide coatings can. achieve the corrosion current of at least less than about 0.5 to 1.0, 1 to 8, or 1.5 to 5 $\mu A\, cm^{-2}$ at the same operating conditions. The electrical conductivities of the BPP oxide coatings may be greater than 100 $S\, cm^{-1}$, where the thickness of the coating layer can be optimized to achieve the target conductivity. In certain embodiments, the electrical conductivities of the BPP oxide coatings measure between 100 and 150, 110 and 140, or 120 and 130 $S\, cm^{-1}$. In other embodiments, the electrical conductivities of the BPP coatings measure between 0.1 and 100, 1 and 80, or 10 and 50 $S\, cm^{-1}$. The interfacial contact resistance between the stainless steel substrate and the given BPP coating may be less than about 0.01 $Ohm\, cm^2$. In certain embodiments, interfacial contact resistance is between 0.001 and 0.2, 0.005 and 0.1, or 0.01 and 0.05 $Ohm\, cm^2$.

Additionally, a variety of methods to grow the corrosion-resistant oxide film layers are disclosed herein. In at least one embodiment, the method includes growing the $Fe_2O_3$ oxide film on the stainless steel through the use of a solution-based process. Hydrolysis can be conducted at 80 to 100° C. in a water bath with a various aging time of 1, 2, 3, 4, 5, 10, 15, 20, 25, 30, 35, 40, 45, 50, 55, or 60 minutes. In one or more embodiments, hydrolysis is conducted at 25 to 100° C. in a water bath with an aging time of between 1 and 120 minutes. The reaction time can also vary from 2 to 96 hours and according to some embodiments may last between 24 and 72 hours. The presence of an containing precursor such as $FeCl_3$ with an acid such as HCl, $HNO_3$, $H_2SO_4$ may additionally help to control the nucleation of different surface facet formations. The solution-based method may further include acid and/or base treatment with other type of oxidizing and/or reducing chemical agents.

An alternative method of growing the $Fe_2O_3$ oxide film(s) disclosed herein includes electrochemical methods. In accordance with such a method, stainless steel may be polished and cleaned with organic solvent such as ethanol and then electrochemically oxidized. The working electrode is typically stainless steel, where counter reference electrodes can vary depending on the voltage windows. Typically, Pt foil and/or Ag/AgCl (with saturated KCl) can be used as the counter and reference electrodes. The immersed electrolytic solution may be acid with varied concentration (e.g., 0.01 to 1 M sulfuric acid), where the exact pH (ranging from pH 1 to 13) can be adjusted or neutralized as needed. The electrochemical method may further include the use of acidic and/or basic. solutions such as, but not limited to, HCl, $H_2SO_4$, $HClO_4$, NaOH, and KOH.

Yet another method of growing the $Fe_2O_3$ oxide film(s) disclosed herein includes heat-treatment. Stainless steel can be heat-treated in a box furnace at temperatures varying from 150 to 900° C. with the presence of mild oxidizing agent such as air or oxygen. The heat-treatment method may further include adjustment of the heating and/or cooling rate from 1 to 10 degrees per minute. The cooling process may be accomplished by a natural cooling or a rapid quenching step.

While the BPP of a PEMFC has been described as a suitable application for the corrosion-resistant iron oxides set forth above, the disclosed oxide layers may be likewise suitable for additional uses. For example, the disclosed corrosion-resistant oxide films may be used as part of surface portion of other industrial. applications requiring a chemically inert, conductive material such as batteries, photovoltaics, consumer electronics, and/or anywhere else a conducting and inert oxide would be beneficial, Additionally, a surface portion of an applicable device may include a relatively thin corrosion-resistant oxide film such that the film is transparent. The material may thus perform as a transparent conducting oxide film, which may be utilized, for example, in photovoltaics.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A corrosion-resistant substrate comprising:
   a bulk portion; and
   a surface portion including an $Fe_2O_3$ oxide layer configured to impart corrosion-resistance properties to the substrate;
   wherein the $Fe_2O_3$ oxide layer of the surface portion comprises a first surface-facet group including (110), (012), or (100) $Fe_2O_3$ surface facets and a second surface-facet group including (001) or (101) $Fe_2O_3$ surface facets.

2. The substrate of claim 1, wherein the $Fe_2O_3$ oxide layer is between 0.001 and 0.5 µm thick.

3. The substrate of claim 1, wherein the (110), (012), and (100) $Fe_2O_3$ surface facets of the first surface-facet group cover greater than 50% of the surface portion of the substrate.

4. The substrate of claim 1, wherein the surface portion further includes a protective coating comprising MgO, $Al_2O_3$, $TiO_2$, or $ZrO_2$.

5. The substrate of claim 1, wherein the surface portion further includes a protective coating having a structure described by:

$$ABO_x,$$

where
A is Mg, Al, Ti, or Zr,
B is Zn, Sn, Cr, or Mo, and
x is an integer ranging from 1 to 8.

6. A corrosion-resistant substrate comprising:
a bulk portion; and
a surface portion including an $Fe_2O_3$ oxide layer comprising a first surface-facet group including (110), (012), or (100) $Fe_2O_3$ surface facets and a second surface-facet group including (001) or (101) $Fe_2O_3$ surface facets, the surface portion configured to impart corrosion-resistance properties to the substrate;
wherein the $Fe_2O_3$ oxide layer is between 0.001 and 0.5 μm thick and the (110), (012), and (100) $Fe_2O_3$ surface facets of the first surface-facet group cover greater than 50% of the surface portion of the substrate, and
wherein the surface portion further includes a protective coating comprising MgO, $Al_2O_3$, $TiO_2$, or $ZrO_2$.

7. The substrate of claim 1, wherein the bulk portion is stainless steel comprising between 10 and 20% chromium and 5 to 10% nickel.

8. The substrate of claim 1, wherein the substrate's electrical conductivity is greater than about 100 S cm$^{-1}$.

9. The substrate of claim 1, wherein the surface portion includes a corrosion resistance of less than 1 μA cm$_{-2}$ at 80° C., pH between 2 and 3 and in the presence of about 0.1 ppm HF.

10. The substrate of claim 1, wherein the $Fe_2O_3$ oxide layer is between 0.15 and 0.3 μm thick.

11. The substrate of claim 1, wherein the $Fe_2O_3$ oxide layer comprises between 70% and 90% of the first surface-facet group and between 10% and 30% of the second surface-facet group.

12. A bipolar plate for a proton exchange membrane fuel cell comprising:
a metal substrate having a bulk portion and a surface portion including an $Fe_2O_3$ oxide layer comprising a first surface-facet group including (110), (012), or (100) $Fe_2O_3$ surface facets and a second surface-facet group including (001) or (101) $Fe_2O_3$ surface facets, the surface portion configured to impart corrosion-resistance properties to the substrate;
wherein the $Fe_2O_3$ oxide layer is between 0.001 and 0.5 μm thick, a corrosion resistance of the surface portion is less than 1 μA cm$^{-2}$ at 80° C., pH between 2 and 3 and in the presence of about 0.1 ppm HF, and the surface portion further includes a protective coating having a structure described by:

$$ABO_x,$$

where
A is Mg, Al, Ti, or Zr,
B is Zn, Sn, Cr, or Mo, and
x is an integer ranging from 1 to 8.

13. The bipolar plate of claim 12, wherein the electrical conductivity of the metal substrate is greater than about 100 S cm$^{-1}$.

14. The bipolar plate of claim 12, wherein the bulk portion is stainless steel comprising between 10 and 20% chromium and 5 to 10% nickel.

15. The bipolar plate of claim 12, wherein $Fe_2O_3$ oxide layer is between 0.15 and 0.3 μm thick.

16. The bipolar plate of claim 12, wherein the $Fe_2O_3$ oxide layer comprises between 70% and 90% of the first surface-facet group and between 10% and 30% of the second surface-facet group.

17. A method of producing a corrosion-resistant stainless steel substrate, the method comprising:
cleaning a stainless steel substrate with organic solvent; and
electrochemically oxidizing the stainless steel substrate to form a corrosion-resistant surface portion including an $Fe_2O_3$ oxide layer comprising a first surface-facet group including (110), (012), or (100) $Fe_2O_3$ and a second surface-facet group including (001) or (101) $Fe_2O_3$ surface facets, the $Fe_2O_3$ oxide layer being between 0.001 and 0.5 μm thick, the (110), (012), or (100) $Fe_2O_3$ surface facets of the first surface-facet group covering greater than 50% of the surface portion of the substrate.

18. The method of claim 17, further comprising depositing a protective coating comprising MgO, $Al_2O_3$, $TiO_2$, or $ZrO_2$ onto the surface portion of the substrate.

19. The method of claim 17, further comprising depositing a protective coating having a structure described by:

$$ABO_x,$$

where
A is Mg, Al, Ti, or Zr,
B is Zn, Sn, Cr, or Mo, and
x is an integer ranging from 1 to 8.

* * * * *

UNITED STATES PATENT AND TRADEMARK OFFICE
CERTIFICATE OF CORRECTION

| | | |
|---|---|---|
| PATENT NO. | : 11,205,783 B2 | Page 1 of 1 |
| APPLICATION NO. | : 16/527847 | |
| DATED | : December 21, 2021 | |
| INVENTOR(S) | : Soo Kim et al. | |

It is certified that error appears in the above-identified patent and that said Letters Patent is hereby corrected as shown below:

In the Claims

Column 13, Line 30, Claim 9:
After "corrosion resistance of less than 1 μA"
Delete "cm$_{-2}$"
Insert --cm$^{-2}$--.

Signed and Sealed this
Twenty-first Day of March, 2023

*Katherine Kelly Vidal*

Katherine Kelly Vidal
*Director of the United States Patent and Trademark Office*